United States Patent
Filsfils et al.

(10) Patent No.: US 11,019,075 B2
(45) Date of Patent: May 25, 2021

(54) PROVIDING PROCESSING AND NETWORK EFFICIENCIES IN PROTECTING INTERNET PROTOCOL VERSION 6 SEGMENT ROUTING PACKETS AND FUNCTIONS USING SECURITY SEGMENT IDENTIFIERS

(71) Applicant: Cisco Technology, Inc., San Jose, CA (US)

(72) Inventors: Clarence Filsfils, Brussels (BE); Pablo Camarillo Garvia, Madrid (ES); Francois Clad, Strasbourg (FR)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 16/019,125

(22) Filed: Jun. 26, 2018

(65) Prior Publication Data
US 2019/0394211 A1 Dec. 26, 2019

(51) Int. Cl.
*H04L 29/06* (2006.01)
*H04L 9/06* (2006.01)
(Continued)

(52) U.S. Cl.
CPC ............ *H04L 63/12* (2013.01); *H04L 9/0643* (2013.01); *H04L 45/7453* (2013.01);
(Continued)

(58) Field of Classification Search
CPC ... H04L 47/34; H04L 63/062; H04L 63/0485; H04L 9/0643; H04L 45/7453;
(Continued)

(56) References Cited

U.S. PATENT DOCUMENTS 9,537,769 B2  1/2017  Bryant et al.
9,762,488 B2  9/2017  Previdi et al.
(Continued)

FOREIGN PATENT DOCUMENTS

WO   2015/005839 A1   1/2015

OTHER PUBLICATIONS

Filsfls et al., "SRv6 Network Programming," draft-filsfils-spring-srv6-network-programming-04, Mar. 4, 2018, The Internet Society, Reston, VA, USA (fifty-seven pages).
(Continued)

*Primary Examiner* — Kambiz Zand
*Assistant Examiner* — Benjamin A Kaplan
(74) *Attorney, Agent, or Firm* — The Law Office of Kirk D. Williams

(57) ABSTRACT

In one embodiment, a Segment Routing network node provides processing and network efficiencies in protecting Internet Protocol version 6 (IPv6) Segment Routing (SRv6) packets and functions using Security Segment Identifiers, which are included in Segment Lists of a Segment Routing Header of a SRv6 packet. The Security Segment Identifier provides, inter alia, origin authentication, integrity of information in one or more headers of the packet, and/or anti-replay protection. In one embodiment, a Security Segment Identifier includes a value determined based on a secured portion of the packet. A typically secured portion includes the Source and Destination Addresses, one or more Segment Identifiers in a Segment List and the Segments Left value. In one embodiment, the Destination Address and/or a Segment Identifier in the Segment List includes and an anti-replay value (e.g., sequence number or portion thereof) which is also in the secured portion of the packet.

20 Claims, 11 Drawing Sheets

(51) Int. Cl.
   *H04L 12/743* (2013.01)
   *H04L 12/801* (2013.01)
(52) U.S. Cl.
   CPC .......... *H04L 47/34* (2013.01); *H04L 63/0485* (2013.01); *H04L 63/062* (2013.01)
(58) Field of Classification Search
   CPC ... H04L 12/4633; H04L 63/123; H04L 45/34; H04L 63/12
   USPC ........................................................ 713/168
   See application file for complete search history.

(56) References Cited

U.S. PATENT DOCUMENTS

| | | | |
|---|---|---|---|
| 10,491,720 B2 | 11/2019 | Brissette et al. | |
| 10,516,610 B2 | 12/2019 | Filsfils et al. | |
| 10,652,366 B2 | 5/2020 | Bashandy et al. | |
| 10,778,816 B2 | 9/2020 | Filsfils et al. | |
| 2016/0135074 A1* | 5/2016 | Welin | H04L 63/0272 370/235 |
| 2018/0219783 A1* | 8/2018 | Pfister | H04L 45/34 |
| 2018/0227168 A1* | 8/2018 | Ward | H04L 41/0631 |
| 2018/0375684 A1* | 12/2018 | Filsfils | H04L 69/22 |
| 2019/0288873 A1* | 9/2019 | Camarillo Garvia | H04L 45/74 |
| 2019/0288940 A1 | 9/2019 | Filsfils et al. | |
| 2020/0328971 A1 | 10/2020 | Bashandy et al. | |

OTHER PUBLICATIONS

Filsfls et al., "Segment Routing Architecture," draft-ietf-spring-segment-routing-15, Jan. 25, 2018, The Internet Society, Reston, VA, USA (thirty-one pages).
Previdi et al., "IPv6 Segment Routing Header (SRH)," draft-ietf-6man-segment-routing-header-10, Mar. 17, 2018, The Internet Society, Reston, VA, USA (thirty-three pages).
Rekhter et al., "A Border Gateway Protocol 4 (BGP-4)," RFC 4271, Jan. 2006, The Internet Society, Reston, VA, USA (104 pages).
Bates et al., "Multiprotocol Extensions for BGP-4," RFC 2283, Feb. 1998, The Internet Society, Reston, VA, USA (nine pages).
Deering et al., "Internet Protocol, Version 6 (IPv6) Specification," RFC 2460, Dec. 1998, The Internet Society, Reston, VA, USA (thirty-nine pages).
S. Deering and R. Hinden, "Internet Protocol, Version 6 (IPv6) Specification," RFC 8200, Jul. 2017, The Internet Society, Reston, VA, USA (forty-two pages).
T. Bates et al., "Multiprotocol Extensions for BGP-4," RFC 4760, Jan. 2007, The Internet Society, Reston, VA, USA (twelve pages).
Rosen et al., "Multiprotocol Label Switching Architecture," RFC 3031, Jan. 2001, The Internet Society, Reston, VA, USA (sixty-one pages).
"Information technology—Telecommunications and information exchange between systems—Intermediate System to Intermediate System intra-domain routeing information exchange protocol for use in conjunction with the protocol for providing the connectionless-mode network service (ISO 8473)," Second Edition, Nov. 15, 2002, ISO/IEC 2002, Switzerland (210 pages).
Previdi et al., "IPv6 Segment Routing Header (SRH)," draft-ietf-6man-segment-routing-header-13, May 23, 2018, The Internet Society, Reston, VA, USA (twenty-one pages).
Seneviratfine and Paridaens, "MPLS Label Stack Authentication methods and algorithms," draft-tsenevir-mpls-auth-01.txt, Jul. 2001, The Internet Society, Reston, VA, USA (seven pages).
Kent and Seo, "Security Architecture for the Internet Protocol," RFC 4301, Dec. 2005, The Internet Society, Reston, VA, USA (101 pages).
S. Kent, "IP Authentication Header," Dec. 2005, RFC 4302, The Internet Society, Reston, VA, USA (thirty-four pages).
S. Kent, "IP Encapsulating Security Payload (ESP)," Dec. 2005, RFC 4303, The Internet Society, Reston, VA, USA (forty-four pages).
PCT International Search Report and Written Opinion, PCT Application PCT/US2019/038246, ISA/EP, European Patent Office, Netherlands, dated Aug. 21, 2019 (eighteen pages).
Previdi et al., "IPv6 Segment Routing Header (SRH)," draft-ietf-6man-segment-routing-header-06, Mar. 13, 2017, The Internet Society, Reston, VA, USA (thirty-five pages).
Brockners et al., "Proof of Transit," draft-ietf-sfc-proof-of-transit-00, May 31, 2018, The Internet Society, Reston, VA, USA (twenty-three pages).
Krawczyk et al., "HMAC: Keyed-Hashing for Message Authentication," RFC 2104, Feb. 1997, The Internet Society, Reston, VA, USA (eleven pages).

* cited by examiner

PROVIDING PROCESSING AND NETWORK EFFICIENCIES IN PROTECTING INTERNET PROTOCOL VERSION 6 SEGMENT ROUTING PACKETS AND FUNCTIONS USING SECURITY SEGMENT IDENTIFIERS

TECHNICAL FIELD

The present disclosure relates generally to processing and sending of Internet Protocol (IP) packets in packet network, such as, but not limited to, according to a Segment Routing Policy.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based on one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
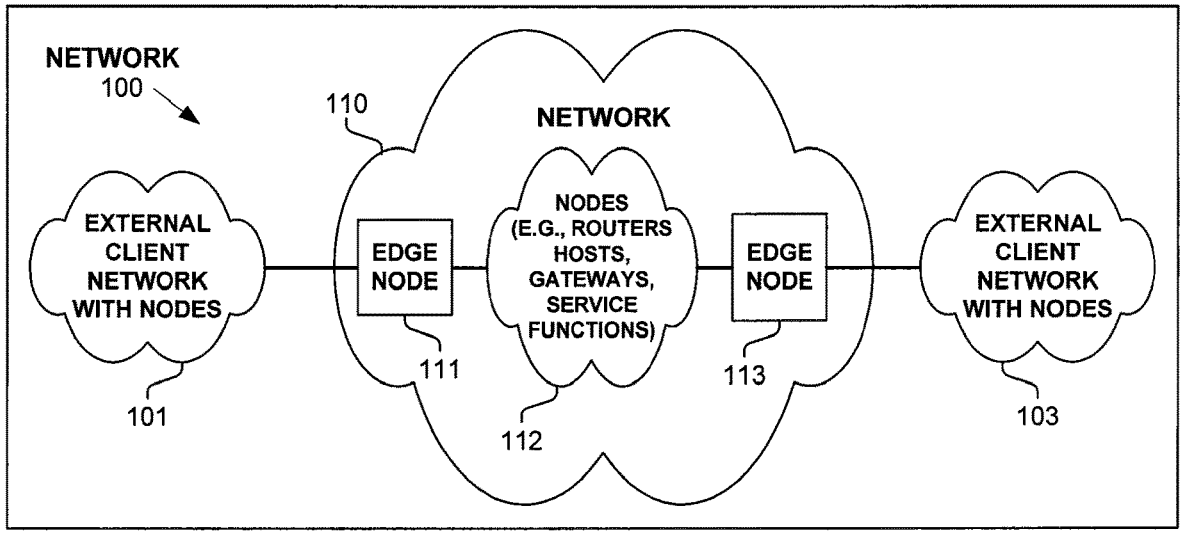
FIG. 1A illustrates a network operating according to one embodiment.

Disclosed are, inter alia, methods, apparatus, computer-storage media, mechanisms, and means associated with providing processing and network efficiencies in protecting Internet Protocol version 6 (IPv6) Segment Routing (SRv6) packets and functions using Security Segment Identifiers.

In one embodiment, a first Segment Routing node formulates one or more Security Segment Identifiers for a secured portion of a particular Segment Routing packet, with these Security Segment Identifier(s) being included in a Segment List of the packet, which is then sent into a network.

In one embodiment, a second Segment Routing node receives a particular Segment Routing packet. After authenticating the secured portion of the particular Segment Routing packet based on one or more Security Segment Identifiers included in a Segment List of the packet, the packet is not dropped, but is further processed typically according to a Segment Routing function. In one embodiment, the second Segment Routing node formulates one or more integrity check value(s) by security processing the secured portion of the packet (e.g., mirroring this processing by the originating node). A comparison operation is performed between a first value based on the integrity check value (possibly exactly the integrity check value) and a second value based on the Security Segment Identifier(s) (possibly exactly the Security Segment Identifiers) in the Segment List of the received packet.

In one embodiment, the IP Destination Address of the packet (i.e., in the outer IPv6 header of the received packet) and/or a current Segment Identifier includes an identifiable anti-replay value (e.g., a sequence number or portion thereof), which is verified as appropriate (e.g., within a sliding window) as part of the authentication process of the received packet.

In one embodiment, each of formulating the Security Segment Identifier(s) and integrity check value(s) includes processing each value or field of the secured portion of the packet using a one-way cryptographic hash function. In one embodiment, a key that is pre-shared between the sending and second node is also input to the one-way cryptographic hash function. In one embodiment, such as, but not limited to, when a result of the hash function is greater than 128 bits, this result is shortened to a value that can be stored in a single Security Segment Identifier.

In one embodiment, the secured portion of the packet includes the Destination Address and/or Source Address of the packet when said received by the second Segment Routing node; one or more Segment Identifiers (e.g., a Segment Identifier with a value of the Destination Address or a different value) in the Segments List of the packet; the Segments Left value corresponding to the Segments List; a Segment Routing Header group tag; a portion of an extended sequence number (e.g., possibly not included in the received packet but determined from the security association between the sending and second node); and/or other value(s) in the received packet (e.g., in a header or payload) or part of the security association.

2. Description

Disclosed are, inter alia, methods, apparatus, computer-storage media, mechanisms, and means associated with providing processing and network efficiencies in protecting Internet Protocol version 6 (IPv6) Segment Routing (SRv6) packets and functions using Security Segment Identifiers.

As used herein Segment Routing includes using Internet Protocol version 6 (IPv6) addresses as Segment Identifiers (SIDs); in other words, as used herein, Segment Routing includes IPv6 Segment Routing (SRv6). As used herein, a Segment Routing node refers to a network node (e.g., router, server, appliance) that performs Segment Routing functionality, including, but not limited to, adding, updating, or removing a Segment Routing Header; performing a Segment Routing function identified by a Segment Identifier that is the IP Destination Address of an IP packet or is a Segment Identifier in a Segment Routing Header. Also, as used herein, an IP packet may or may not be a Segment Routing Packet; but a Segment Routing packet is an IP packet.

The term "outer IP header" of a packet refers to the IP header (not an Extension header) used in processing and forwarding of the packet, and does not refer to a header of a packet encapsulated (e.g., in the payload) of the packet. The terms "Destination Address" and "Source Address" respectively refer to the value of the IP Destination and Source Address fields of the outer IP header. The phrase "wherein the value, when the particular packet was said received by the particular node, of the Destination Address" refers to the IP Destination Address of the packet when the packet was received by the particular node, which may or may not be the same as the IP Destination Address of the packet when sent from the particular node.

The terms "node" and "network node" are used herein to refer to a router or host. The term "route" is used herein to refer to a fully or partially expanded prefix/route (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. Also, as used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1A illustrates a network 100 (e.g., an aggregation of one or more networks of one or more different entities) operating according to one embodiment. As shown, network 100 includes client networks 101 and 103 (which are the same network in one embodiment) communicatively coupled to Segment Routing (SR) provider network 110. In one embodiment, each of client networks 101 and 103 include hosts (e.g., end nodes) with upper-layer applications that communicate via network 100. In one embodiment, some of the hosts in client network 101 and/or 103 are SR-capable in that they can generate and process Segment Routing packets.

In one embodiment, Segment Routing network 110 (e.g., a provider network) includes Segment Routing edge nodes 111 and 113, and a network 112 of network nodes including SR-capable routers (and possibly some that are not SR-capable in that they do not process a Segment Routing header/complete Segment Identifier), SR gateways, service functions, and hosts (e.g., end nodes). In one embodiment, SR edge nodes 111 and 113 process packets received from networks 101 and 103, which may include encapsulating or otherwise processing these packets into SR packets such as by adding a SR header (and possibly another IP header) to these packets according to a data plane ascertained Segment Routing policy, and subsequently decapsulating or removing a Segment Routing header (and possibly another IP header) and forwarding the native (Segment Routing or IP) packets into network 101 and 103.

In one embodiment and in response to receiving a packet, a Segment Routing edge node 111, 113 and/or a Segment Routing node within network 112 determines a Segment Routing policy (e.g., list of complete Segment Identifiers) through and/or to which to forward a Segment Routing packet encapsulating the native packet. These policies can change in response to network conditions, network programming, etc. In one embodiment, the Segment Routing policy specifies to add one or more SR headers, each with one or more Segment Identifiers, resulting in a Segment Routing packet having one or more Segment Routing headers. In one embodiment, a native packet is received without a Segment Routing header (possibly with an IP Destination Address that is a Segment Identifier/IP address of the receiving Segment Routing node), and the Segment Routing node encapsulates the native packet in a Segment Routing packet including one or more added Segment Routing headers, each including one or more Segment Identifiers. In one embodiment, a Segment Routing packet is received with a Segment Routing header, and with Segment Routing node adding one or more Segment Routing headers resulting in a Segment Routing packet including one or more added Segment Routing headers, each including one or more Segment Identifiers. In contrast, and for each of these scenarios a single Segment Routing header could have been used that includes all of the Segment Identifiers.

Figure 1B:
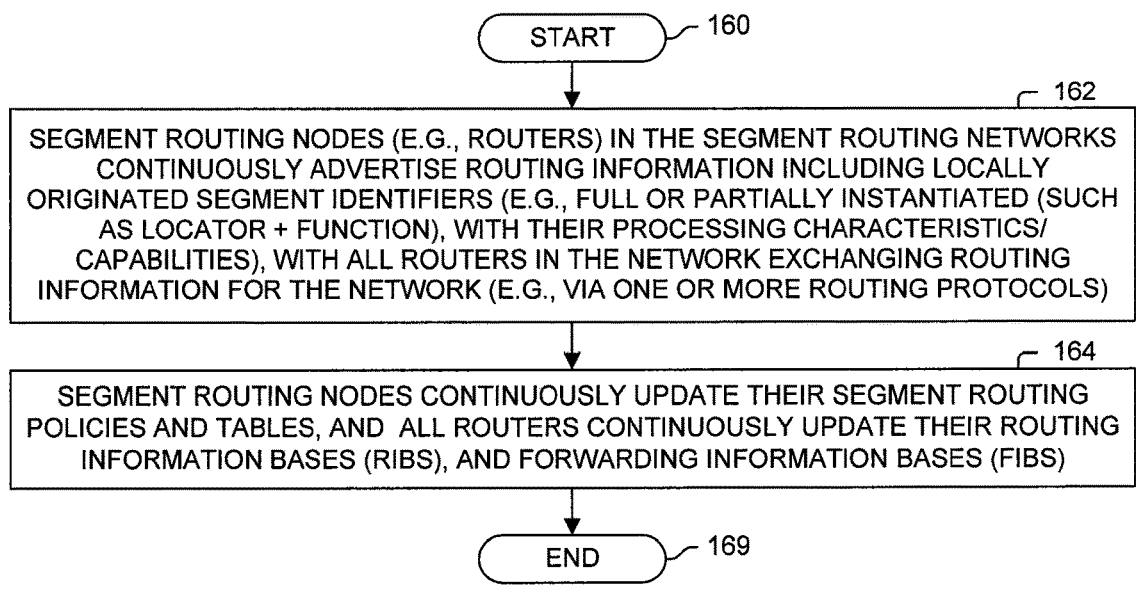
FIG. 1B illustrates a process according to one embodiment.

FIG. 1B illustrates a process according to one embodiment associated with providing processing and network efficiencies in protecting SRv6 packets and functions using Security Segment Identifiers. Processing begins with process block 160. In process block 162, routers in the networks continuously advertise and exchange routing information including Segment Routing information (e.g., routes including Segment Identifiers of network nodes and their corresponding function or function/arguments, attributes of Segment Identifiers, attributes of node) and other routing information (e.g., IPv4 or IPv6 topology information) typically via one or more routing protocols and/or other protocols. In process block 164, Segment Routing and other network nodes continuously update their Segment Routing policies and routing/forwarding information as required (e.g., based on information received via a routing or other protocol, from a network management system, etc.). Processing of the flow diagram of FIG. 1B is complete as indicated by process block 169.

Figure 2A:
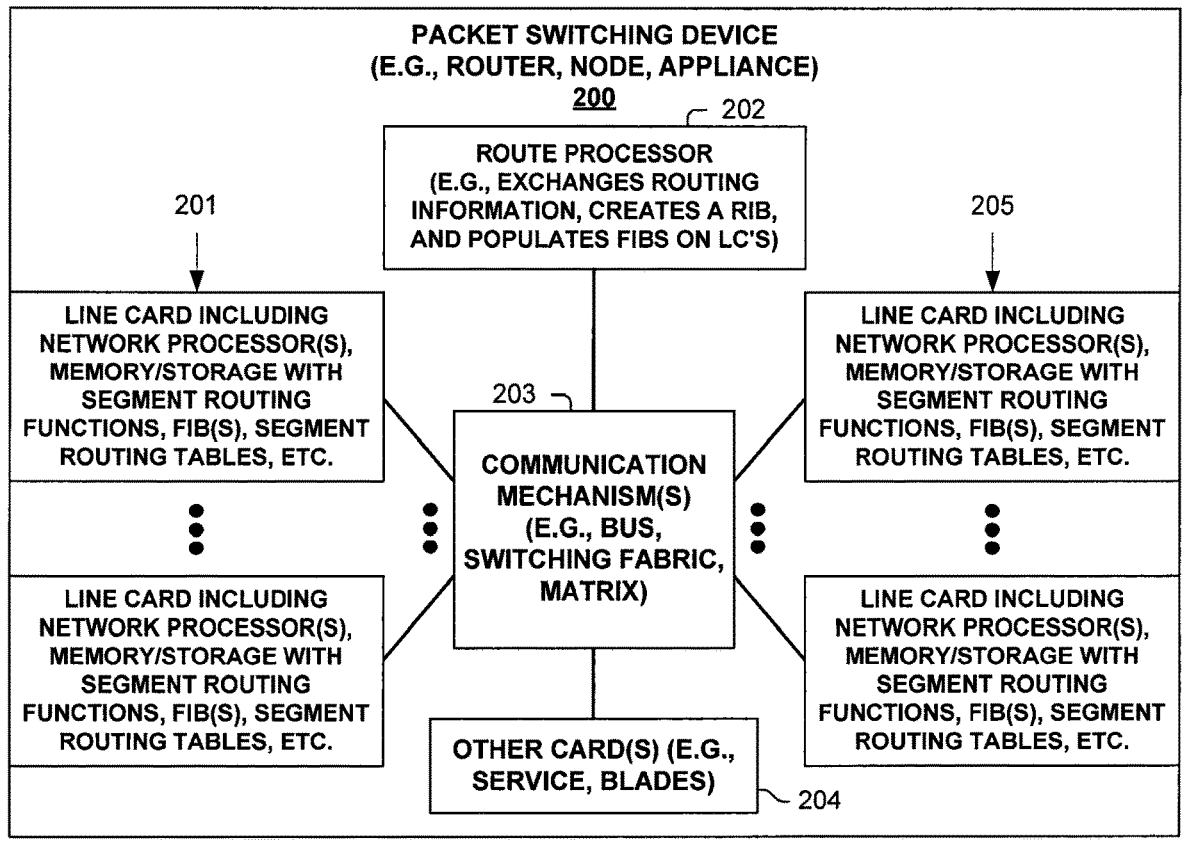
FIG. 2A illustrates a packet switching device according to one embodiment.
Figure 2B:
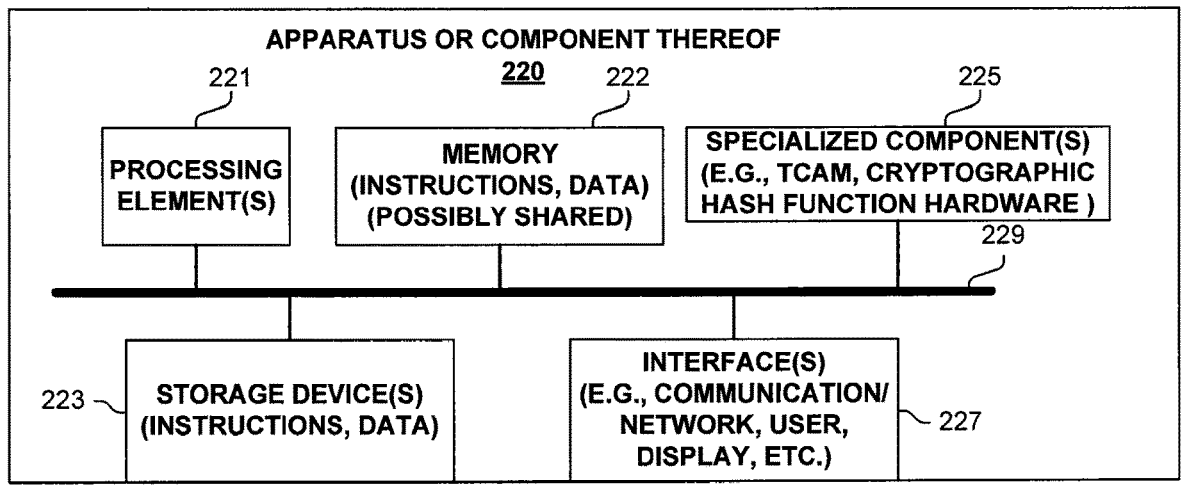
FIG. 2B illustrates an apparatus according to one embodiment.

FIGS. 2A-B and their discussion herein provide a description of various network nodes according to one embodiment.

FIG. 2A illustrates one embodiment of a packet switching device 200 (e.g., router, node, appliance, gateway) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with providing processing and network efficiencies in protecting SRv6 packets and functions using Security Segment Identifiers. Packet switching device 200 also has a control plane with one or more processing elements (e.g., Route Processor(s)) 202 for managing the control plane and/or control plane processing of packets associated with providing processing and network efficiencies in protecting SRv6 packets and functions using Security Segment Identifiers. Packet switching device 200 also includes other cards 204 (e.g., service cards, blades) which include processing elements that are used in one embodiment to process (e.g., forward/send, drop, manipulate, change, modify, receive, create, duplicate, perform SR functionality possibly with shared memory with one or more service functions, apply a service according to one or more service functions) packets associated with providing processing and network efficiencies in protecting SRv6 packets and functions using Security Segment Identifiers, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, Segment Routing functions are implemented on line cards 201, 205.

FIG. 2B is a block diagram of an apparatus 220 (e.g., host, router, node, destination, or portion thereof) used in one embodiment associated with providing processing and network efficiencies in protecting SRv6 packets and functions using Security Segment Identifiers. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including Segment Routing processing) and/or service function operations; associative memory; binary and/or ternary content-addressable memory; Application Specific Integrated Circuit (s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
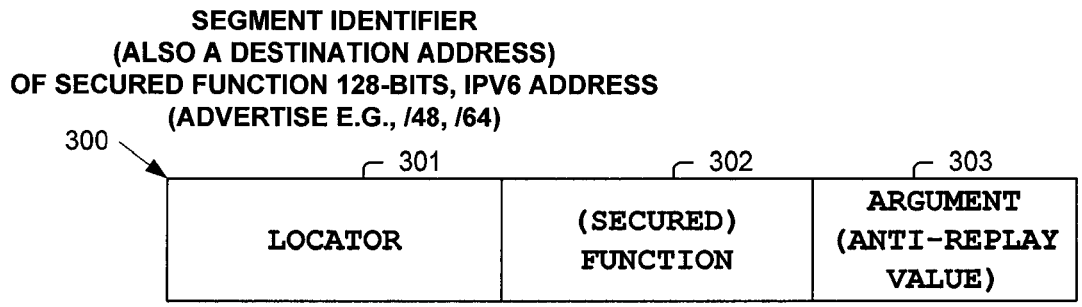
FIG. 3A illustrates a Segment Identifier of a secured Segment Routing function according to one embodiment.

FIG. 3A illustrates a Segment Identifier 300 according to one embodiment. As shown, Segment Identifier 300 includes locator 301 that is typically unique to a node; function 302 that identifies a Segment Routing function (e.g., a secured or non-secured function); and argument 303 (e.g., an anti-replay value or parameter for the function). The /48, /64, /96 or other portion of Segment Identifier 300 is advertised as an address of a network node, with Segment Identifier 300 also being used as the Destination Address of a Segment Routing packet to steer the packet to that node. In one embodiment, the advertisement of Segment Identifier 300 excludes the argument 303 portion, as it varies typically on a per-sequential packet basis, such as for, but not limited to, providing an anti-replay value (e.g., sequence number) for use by the receiving Segment Routing node.

Figure 3B:
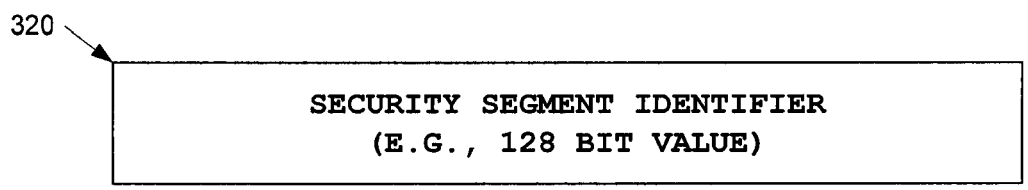
FIG. 3B illustrates a Security Segment Identifier according to one embodiment.

FIG. 3B illustrates a Security Segment Identifier 320 according to one embodiment wherein it is a value (e.g., 128 bits) that can fit in one or more Segment Identifiers in a Segment List of a Segment Routing packet.

Figure 3C:
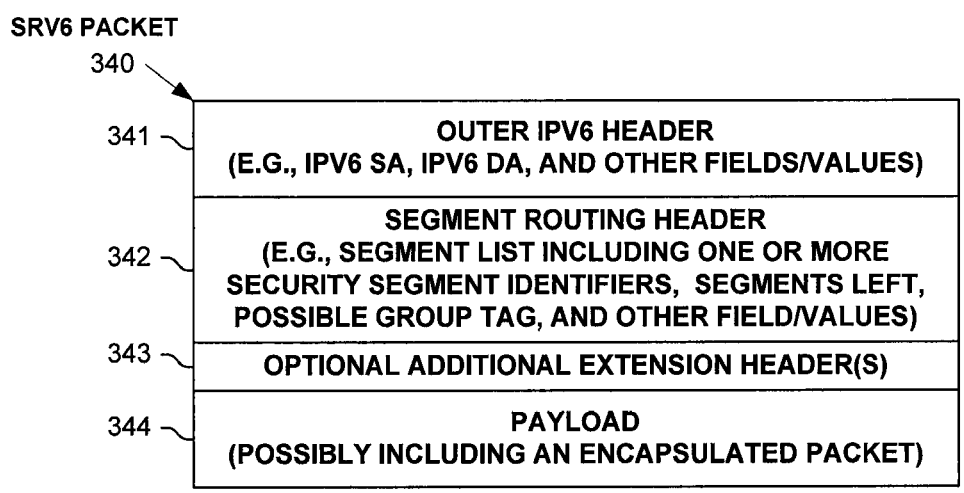
FIG. 3C illustrates a Segment Routing packet according to one embodiment.

FIG. 3C illustrates a SRv6 packet 340 according to one embodiment. As shown, SRv6 packet 340 includes an outer IPv6 header 341 that includes a Source Address and a Destination Address (and other values), Segment Routing header 342 (e.g., that includes a Segment List with one or more Security Segment Identifiers and/or other Segment Identifiers, a Segments Left value, group tag and other fields/values); optional additional extension headers 343 (that may include another Segment Routing header); and payload 344 (possibly including an encapsulated original packet).

One embodiment improves processing and network efficiencies by using the Segment List of a Segment Routing Header to store Security Segment Identifiers, albeit in violation of standardized Segment Routing requirements. The Security Segment Identifier is included not for being an address of a network node (e.g., and identifying a Segment Routing function), but rather is a security authentication value formulated based on portions of the Segment Routing packet (e.g., Destination Address and/or Segment Identifier including the anti-replay value) and typically other values (e.g., a pre-shared key).

In one embodiment, one or more Security Segment Identifiers are used to authenticate a packet, as well as protect a Segment Routing function from being invoked for a non-authenticated packet. In one embodiment, one or more Security Segment Identifiers are used to only protect a single Segment Routing function and therefore only that corresponding network node performs the authentication, and not all Segment Routing nodes that the Segment Routing packet may traverse. Also in one embodiment, one or more Security Segment Identifiers are used in authentication of the packet including the Source Address and/or Destination Address which may vary as the packet traverses the network. Typically, the creator of the Security Segment Identifier(s) that protect these values does so with their values when received by the second Segment Routing node, and not when sent from the originating Segment Routing node.

Figure 4A:
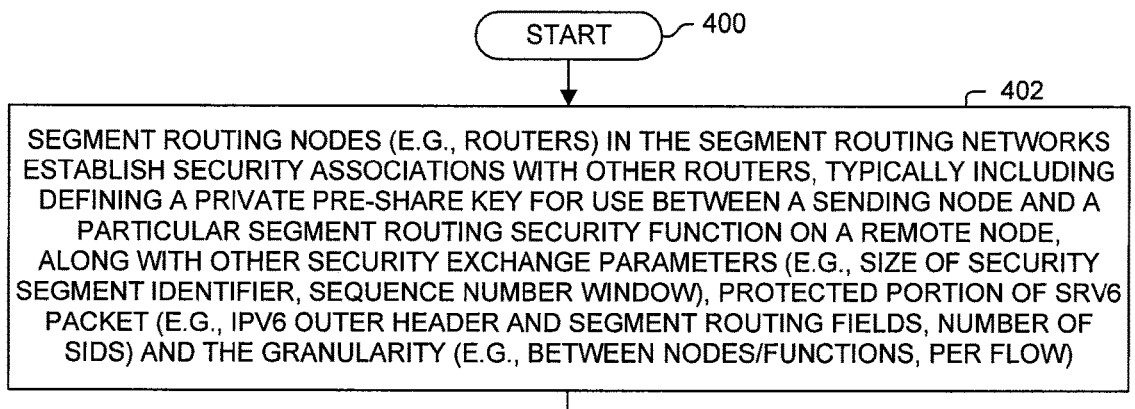
FIG. 4A illustrates a process according to one embodiment.

FIG. 4A illustrates a process according to one embodiment. Processing begins with process block 400. In process block 402, segment routing nodes (e.g., routers) in the segment routing networks establish security associations with other routers in order to send secured Segment Routing packets. In one embodiment, a security association is between two Segment Routing nodes, thus, each network node does not require the same pre-shared key. In one embodiment, a security association is a one-to-many or many-to-many relationship among Segment Routing nodes.

In one embodiment, these security associations are exchanged using a routing or other protocol, using a network management or operating system or path computation engine, or via another manner. This security association typically includes defining a private pre-share key for use between a sending node and a particular segment routing security function on a remote node, as well as other security parameters such as, but not limited to the size of a Security Segment Identifier (e.g., number of Segment Identifiers in the Segment List); whether to provide anti-replay protection, and if so, possibly a range for sequence numbers; what fields/values from the packet are included in the protected portion (e.g., Source Address, Destination Address, Segments Left, group tag, Segment Identifiers protected); other values (e.g., whether to use an extended sequence number); and the granularity of the security association (e.g., used for all packets between the two nodes, only for a particular flow). These security associations are updated (e.g., added, removed, modified) as needed. Processing of the flow diagram of FIG. 4A is complete as indicated by process block 409.

Figure 4B:
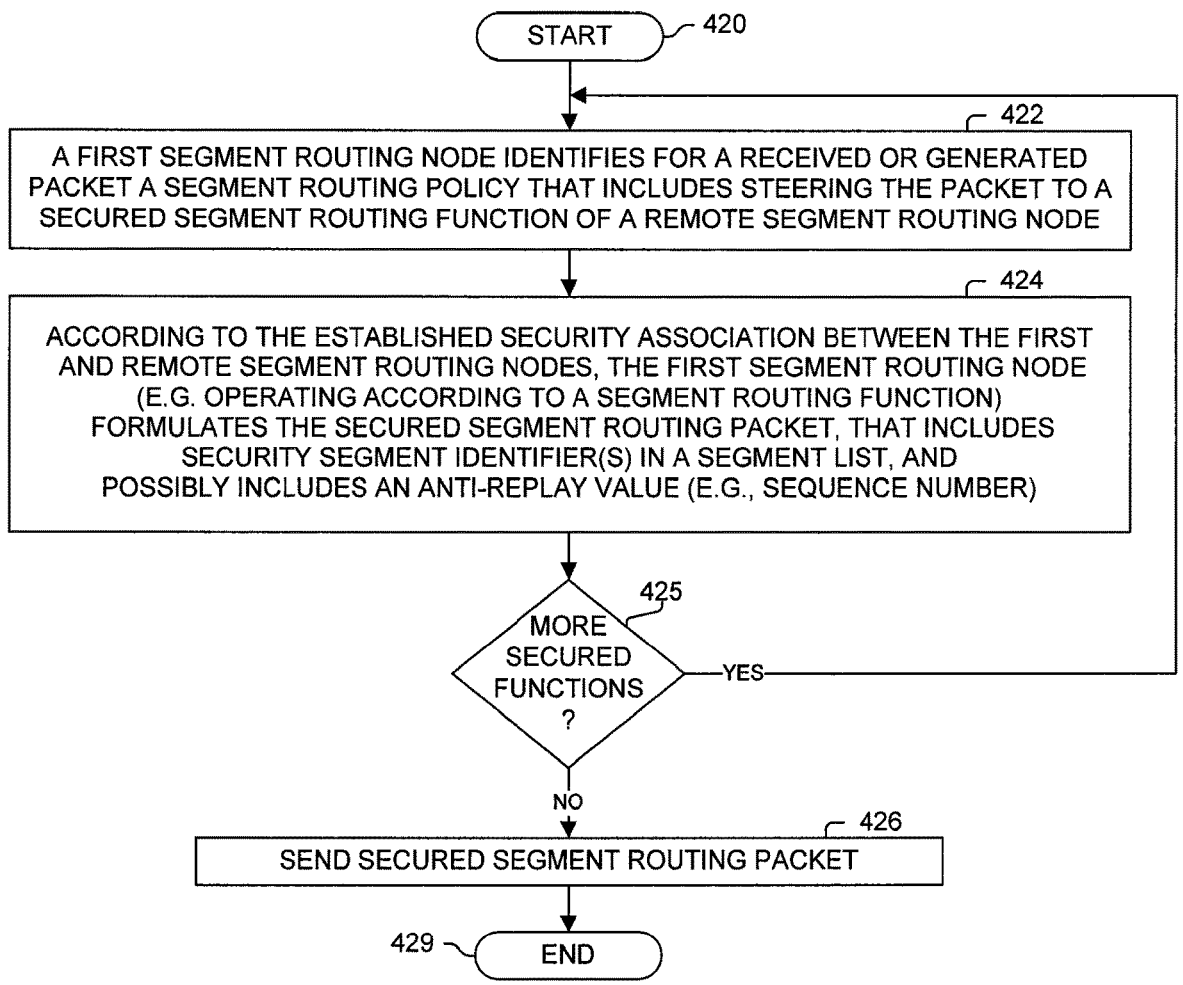
FIG. 4B illustrates a process according to one embodiment.

FIG. 4B illustrates a process according to one embodiment. Processing begins with process block 420. In process block 422 for a received or generated packet, a first segment routing node identifies a Segment Routing policy that includes steering the packet to a secured Segment Routing function of a remote segment routing node according to an established security association between the first and remote Segment Routing nodes. Processing continues to process block 424.

In one embodiment, the security association defines how the one or more Security Segment Identifiers will be formulated, including what cryptographic hashing (e.g. Secure Hash Algorithm 2/SHA-2) or other authentication function will be used, the values on which be used in formulating the Security Segment Identifier(s). In one embodiment, these values include, but are not limited to:

IPv6 Source Address,
IPv6 Destination Address,
Segment Routing Header tag,
current Segment Identifier (typically the same value as the Destination Address),
one or more Segments (e.g., Segment Identifier(s)) in a Segment List,
Segments Left value,
Segment Routing Header Group Tag,
Next Header Field,
an extended (e.g., 64-bit) sequence number not communicated in the packet but part of the security association,
pre-shared key, and/or
other values extracted from the packet or acquired elsewhere.

In one embodiment, a 256-bit value is formulated that is communicated in two Security Segment Identifiers in a Segment List of a packet. One embodiment formulates a single Security Segment Identifier by extracting 128 or fewer bits from a cryptographic hashing result (e.g., a 256-bit value generated by SHA-2).

In one embodiment, the security association designates to include an anti-replay value (e.g., a sequence number from a sliding window) in the Destination Address and/or the current Segment Identifier in the Segments List of the receiving Segment Routing node. In one embodiment, each of the sending and receiving Segment Routing nodes maintains an extended sixty-four bit sequence number, but only communicates the low-order thirty-two bits of an extended sixty-four bit sequence number in the argument/low-order bits of the Destination Address and/or current Segment Identifier. To provide protection of this anti-replay value, it is typically included in the formulation of the Security Segment Identifier(s), such as, but not limited to, directly or as a portion of the Destination Address and/or current Segment Identifier.

The security Segment Identifier is added to a Segment List of the packet along with updating other fields of the Segment Routing Packet.

As determined in process block 425, if there are additional secured functions to be traversed by the packet, then processing returns to process block 422 to process accordingly; otherwise processing proceeds to process block 426. For example, a segment routing policy may steer a packet through two or more secure Segment Routing functions, each protected by a different one or more Security Segment Identifiers (even with a first of the Security Segment Identifier(s) formulated based on a second of the Security Segment Identifier(s), and possibly formulated based on different Source and Destination Addresses, different Segments Left values, an added Segment Routing Policy by an intervening Segment Routing node, etc. One embodiment generates correct Security Segment Identifiers for these and other scenarios.

Continuing with process block 426, the secured Segment Routing packet is sent into the network, and processing of the flow diagram of FIG. 4B is complete as indicated by process block 429.

Figure 4C:
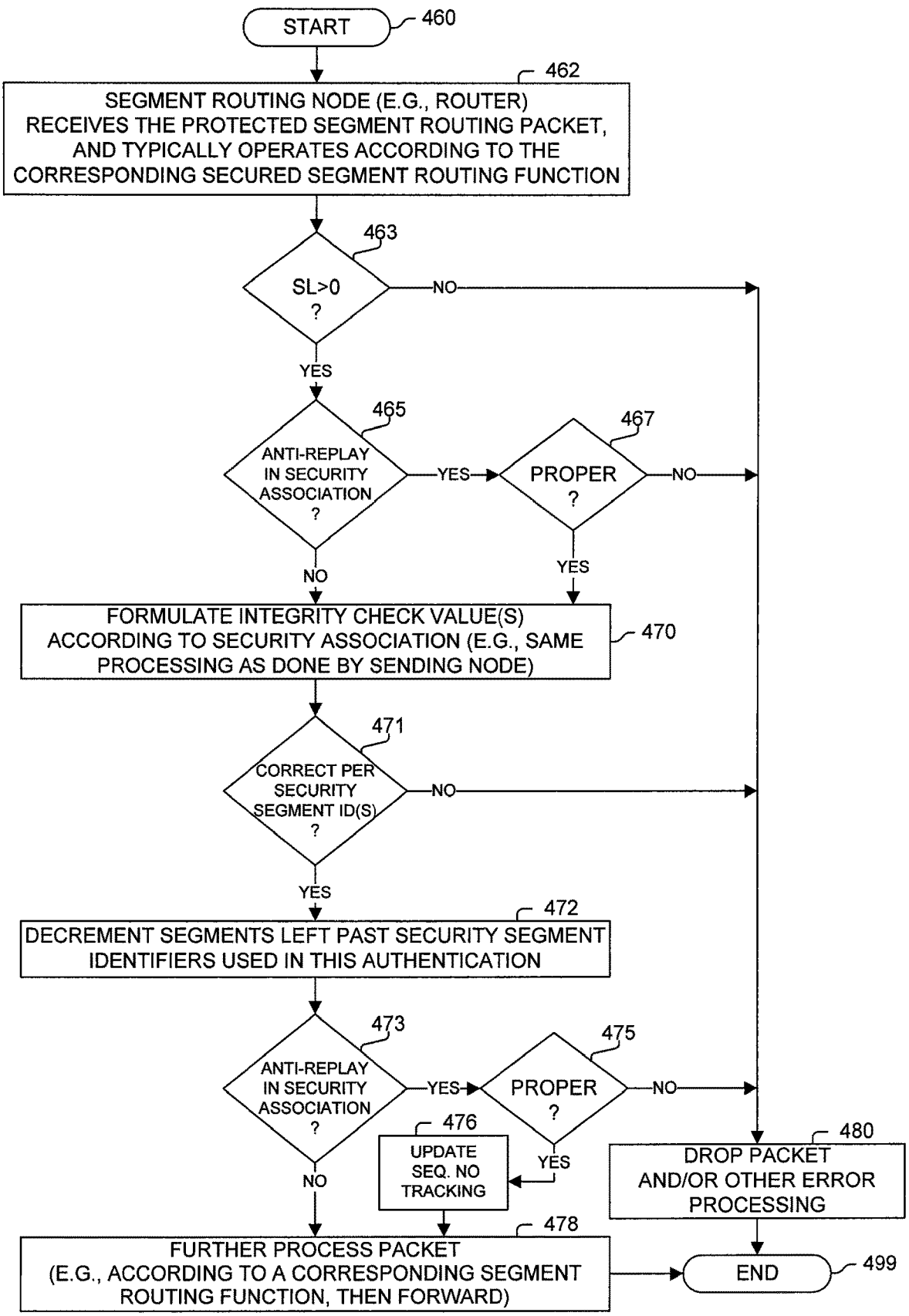
FIG. 4C illustrates a process according to one embodiment.

FIG. 4C illustrates a process according to one embodiment. Processing begins with process block 460. In process block 462, a Segment Routing node (e.g., router) receives the protected Segment Routing packet, and operates according to secured Segment Routing function identified by the Destination Address (and typically by the current Segment Identifier in a Segment List).

As determined in process block 463, if Segments Left is zero (then the Security Segment Identifier is not present), then processing proceeds to process block 480; otherwise processing continues to process block 465.

As determined in process block 465, if anti-replay is to be invoked per the corresponding Security Association, then processing proceeds to process block 467; otherwise, processing proceeds directly to process block 470.

As determined in process block 467, if the sequence number (e.g., in the low-order bits/argument of the current Segment Identifier or the Destination address) is proper for the packet (e.g., within a current sliding window or other expected value), then processing proceeds to process block 470; otherwise processing proceeds to process block 480.

Continuing in process block 470, the node formulates one or more integrity check values according to the Security Association (e.g., typically the same processing performed by the originating node in process block 424 of FIG. 4B). As determined in process block 471, if the integrity check value(s) are correct per the Security Segment Identifier(s) in the Segment List of the received packet, then processing proceeds to process block 472; otherwise processing proceeds to process block 480. Typically, these two formulated values will be the same, but in one embodiment, some additional manipulation is performed.

Continuing with process block 472, the Segments Left value is decremented past the corresponding one or more Security Identifiers. Then as determined in process block 473, if anti-replay is to be invoked per the corresponding Security Association, then processing proceeds to process block 475; otherwise, processing proceeds directly to process block 478. One embodiment performs this anti-replay check twice, inter alia, to ensure that multiple packets with a same sequence number are not processed overlapping in time.

Continuing with process block 475, if the sequence number (e.g., in the low-order bits/argument of the current Segment Identifier or the Destination address) is proper for the packet (e.g., within a current sliding window or other expected value), then processing proceeds to process block 476; otherwise processing proceeds to process block 480. In process block 476, the local sequence number tracking for the Security Association is updated to reflect that the sequence number was used (so another packet cannot use it, at least until a possible wrap-around of sequence numbers). Processing continues with process block 478.

Continuing with process block 478, the packet has been authenticated (e.g., origin authenticated, integrity of the segments protected, anti-replay protection) in a manner to allow further processing of the packet, typically by another Segment Routing function that was protected from execution unless the packet was authenticated. Processing proceeds to process block 499.

Continuing with process block 480, the packet is dropped as it was not authenticated and/or other error processing is performed. Processing proceeds to process block 499.

Processing of the flow diagram of FIG. 4C is completed as indicated by process block 499.

Figure 5A:
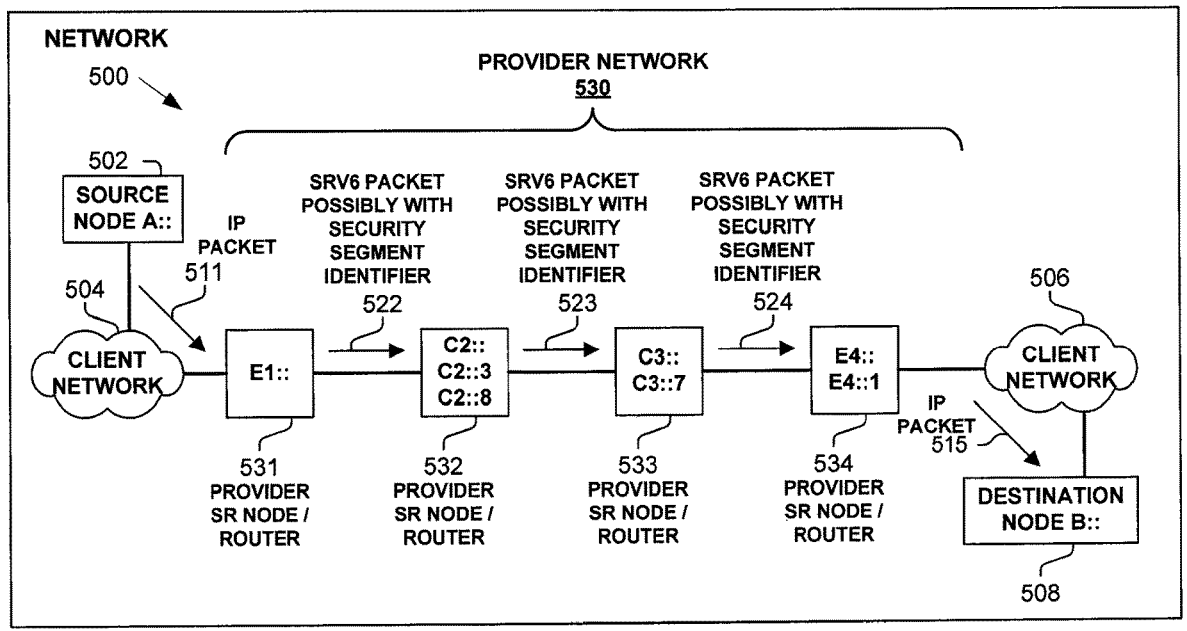
FIG. 5A illustrates a network operating according to one embodiment.

FIG. 5A illustrates a network 500 operating according to one embodiment.

Network 500 includes client network 504 (with source node 502 having an IPv6 address of A::) and client network 506 (with destination node 508 having an IPv6 address of B::).

Network 500 also includes provider network 530, that includes provider nodes 531-534 (e.g., Segment Routing routers):

SR Router 531 has an IPv6 address of E1::,
SR Router 532 has IP Addresses of C2::, C2::3, and C2::8;
SR Router 533 has IPv6 addresses of C3::, and C3::7, and
SR Router 534 has IPv6 addresses of E4:: and E4::1.

Each Router 531-536 typically advertises all of their IP addresses using a routing or other protocol. Note, each of IPv6 addresses C2::3, C2::8; C3::7, and E4::1 include a specification of a secured Segment Routing function that in one embodiment, operates according to the flow diagram of FIG. 4C.

FIG. 5A also shows the progression through network 500 of a same IP packet (denoted 511, 522, 523, 524, and 515 for ease of communicating its current position in network 500). Each of FIGS. 5B-F illustrated different scenarios associated with this IP packet (511, 522, 523, 524, 515) traversing network 500 according to one embodiment that provides processing and network efficiencies in protecting Internet Protocol version 6 (IPv6) Segment Routing (SRv6) packets and functions using Security Segment Identifiers.

Each of FIGS. 5B-F illustrate, according to one embodiment, processing of a packet as it is steered through network 500 as illustrated in FIG. 5A. These embodiments are illustrative of only some of an unlimited number of different processing that is performed by one or more Segment Routing nodes in accordance with one embodiment. In one embodiment, this processing includes that described in relation to FIG. 4B and/or FIG. 4C.

Figure 5B:
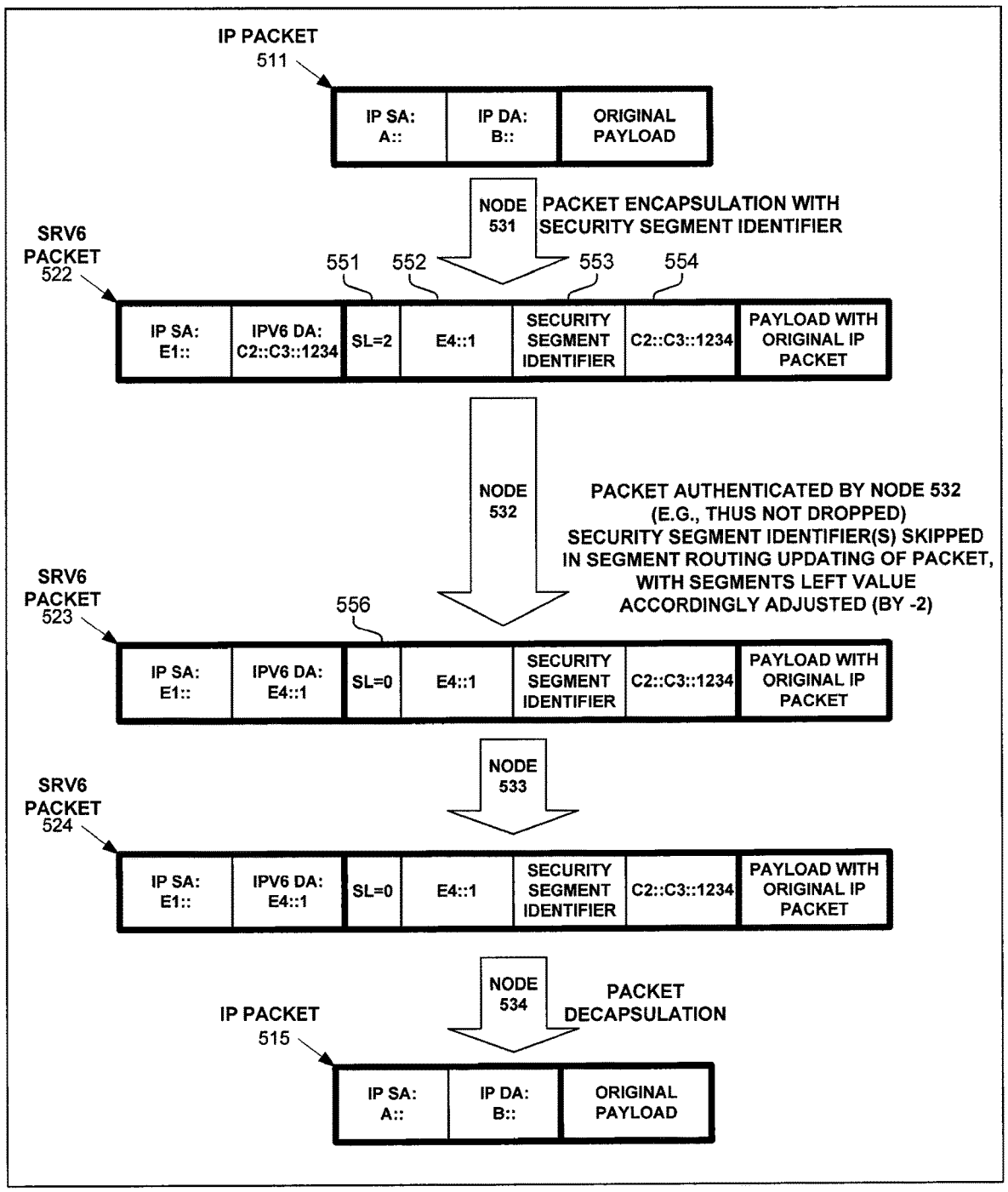
FIG. 5B illustrates packet processing of a packet according to one embodiment.

FIG. 5B illustrates an IP packet 511 being encapsulated and forwarded through network 500 according to a secure Segment Routing policy of one embodiment, with a Security Association having been established between Segment Routing nodes 531 and 532 for being authenticated by a secured Segment Routing function identified by C2::C3, with anti-replay protection enabled, and using a single Security Segment Identifier.

Network node 531 receives packet 511 and generates secure Segment Routing packet 522 which includes original packet 511 encapsulated therein. Segment Routing packet 522 has a Source Address of node 531, a Destination Address (same value as Segment Identifier 554) of a secured Segment Routing function of node 531. Segment Routing Header includes the three Segment Identifiers 552-554, Segments Left 551 having a value of two as Segment Identifier 554 is the current Segment Identifier (and the same as the Destination Address of packet 522). Note, the argument portion of Segment Identifier 554 (and low-order bits of the Destination Address) includes an anti-replay sequence number value of 1234. Node 531 formulates security Segment Identifier 553 according to the established Security Association. In one embodiment, a one-way cryptographic hash function is performed on at least the secured portion of packet 522 in formulating the value of Security Segment Identifier 553, typically using a pre-shared key that is part of the security association. Security Segment Identifier 553 is inserted in a Segment List of a Segment Routing Header of packet 522. In one embodiment, the secured portion includes the Destination Address of packet 522 and/or the current Segment Identifier 554 (that includes at least a portion of the anti-replay value so that it is secured). In one embodiment, the secured portion includes the Source Address of packet 522, the Destination Address of packet 522, the current Segment Identifier 554, Segments Left 551, Segment Identifier 552, and/or other values (e.g., from packet 552, part of the security association such as, but not limited to, an extended sequence number), and/or otherwise described herein. Node 531 sends packet 522, including Security Segment Identifier 553, into network 500.

Network node 532 receives packet 522, which has a Destination Address that is an address of node 532. Security authentication processing is performed according to the secured Segment Routing function identified by C2::C3 and according to the corresponding security association. In one embodiment, this authentication processing includes verifying that the sequence number is correct (and only used once) such as using a sliding window technique, and typically repeating the processing performed by node 531 by using the same one-way cryptographic hash function processing on the same values from packet 522 and that are part of the security association (e.g., the pre-shared key) to generated an integrity check value. The packet is authenticated based on the integrity check value and Security Segment Identifiers 553, such as by, but not limited to, a direct comparison, or possibly after some manipulation of one or both of these values (e.g., multiply each by two and compare those values). In response to authentication, packet 522 is further processed (e.g., not dropped) such as, but not limited to, according to another Segment Routing function invoked by the secured Segment Routing function identified by C2::C3.

Segments Left 551 of packet 522 is updated (to zero), as reflected in Segments Left 556 of packet 523, by being reduced by two to advance past both current Segment Identifier 554 and Security Segment Identifier 553 of packet 522, with the Destination Address of packet 523 being set to the Segment Identifier in the Segment List identified by the value of Segments Left 556 (i.e., value of zero). Packet 523 is sent from node 532.

Node 533 of network 500 receives packet 523, which is not addressed to node 533, thus is forwarded back into network 500 as denoted packet 524.

In response to receiving packet 524, node 534 operates according to the Segment Routing function identified by E4::1 to decapsulate and send IP packet 515 to client network 506. In one embodiment, even though received packet 524 includes the Security Segment Identifier, node 534 does not perform authentication processing based thereon; rather, node 534 simply ignores the Security Segment Identifier.

Figure 5C:
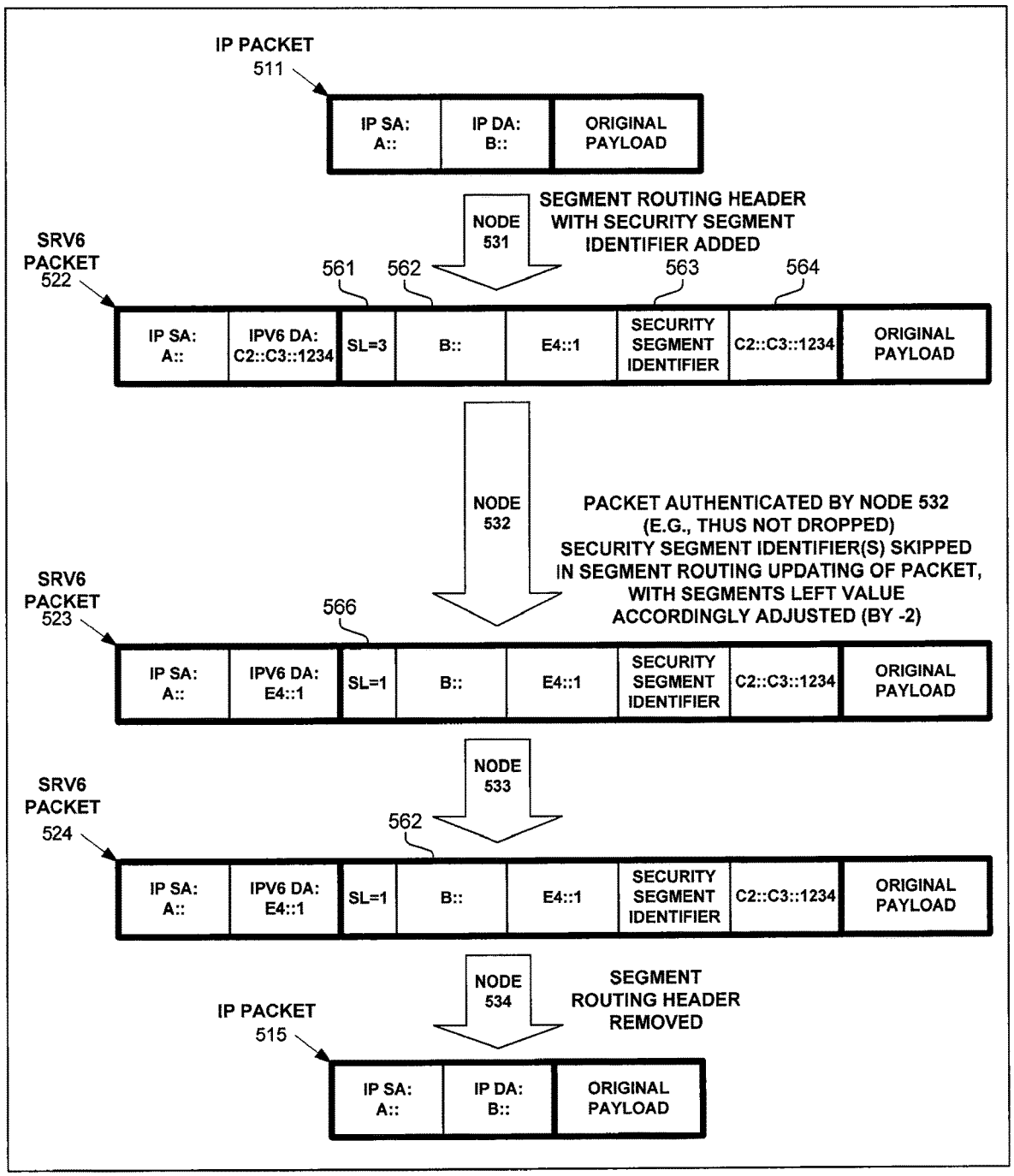
FIG. 5C illustrates packet processing of a packet according to one embodiment.

FIG. 5C illustrates an IPv6 packet 511 being modified to add a Segment Routing Header and forwarded through network 500 according to a secure Segment Routing policy of one embodiment, with a Security Association having been established between Segment Routing nodes 531 and 532 for being authenticated by a secured Segment Routing function identified by C2::C3, with anti-replay protection enabled, and using a single Security Segment Identifier.

This network processing is very similar to that described in relation to FIG. 5B (or otherwise described herein), so the full description will not be repeated. FIG. 5B illustrates packet encapsulation with the use of a Security Segment identifier, while FIG. 5C illustrates adding a Segment Routing Header with the use of a Security Segment identifier.

Network node 531 receives packet 511 and generates secure Segment Routing packet 522 which includes original packet 511 with a Segment Routing Header added thereto. The Segment List includes a fourth Segment Identifier 562, which is the Destination Address of received packet 511, with Segments Left 561 set to three. The Destination Address of packet 522 is set to the first Segment Identifier 564. Note, the argument portion of Segment Identifier 564 (and low-order bits of the Destination Address) includes an anti-replay sequence number value of 1234. Node 531 formulates security Segment Identifier 563 according to the established Security Association. In one embodiment, the protected portion also includes Segment Identifier 562. Node 531 sends packet 522, including Security Segment Identifier 563, into network 500.

Network node 532 receives packet 522, which has a Destination Address that is an address of node 532. Security authentication processing is performed according to the secured Segment Routing function identified by C2::C3 and according to the corresponding security association. In response to authentication, packet 522 is further processed (e.g., not dropped) such as, but not limited to, according to another Segment Routing function invoked by the secured Segment Routing function identified by C2::C3.

Segments Left 561 of packet 522 is updated (to one), as reflected as Segments Left 566 of packet 523, by being reduced by two to advance past both current Segment Identifier 564 and Security Segment Identifier 563 of packet 522, with the Destination Address of packet 523 being set to the Segment Identifier in the Segment List identified by the value of Segments Left 566 (i.e., value of one). Packet 523 is sent from node 532.

Node 533 of network 500 receives packet 523, which is not addressed to node 533, thus is forwarded back into network 500 as denoted packet 524.

In response to receiving packet 524, node 534 operates according to the Segment Routing function identified by E4::1 to decapsulate and send IP packet 515 to client network 506 (with a Destination Address of Segment Identifier 562 of received packet 524). In one embodiment, even though received packet 524 includes the Security Segment Identifier, node 534 does not perform authentication processing based thereon; rather, node 534 simply ignores the Security Segment Identifier.

Figure 5D:
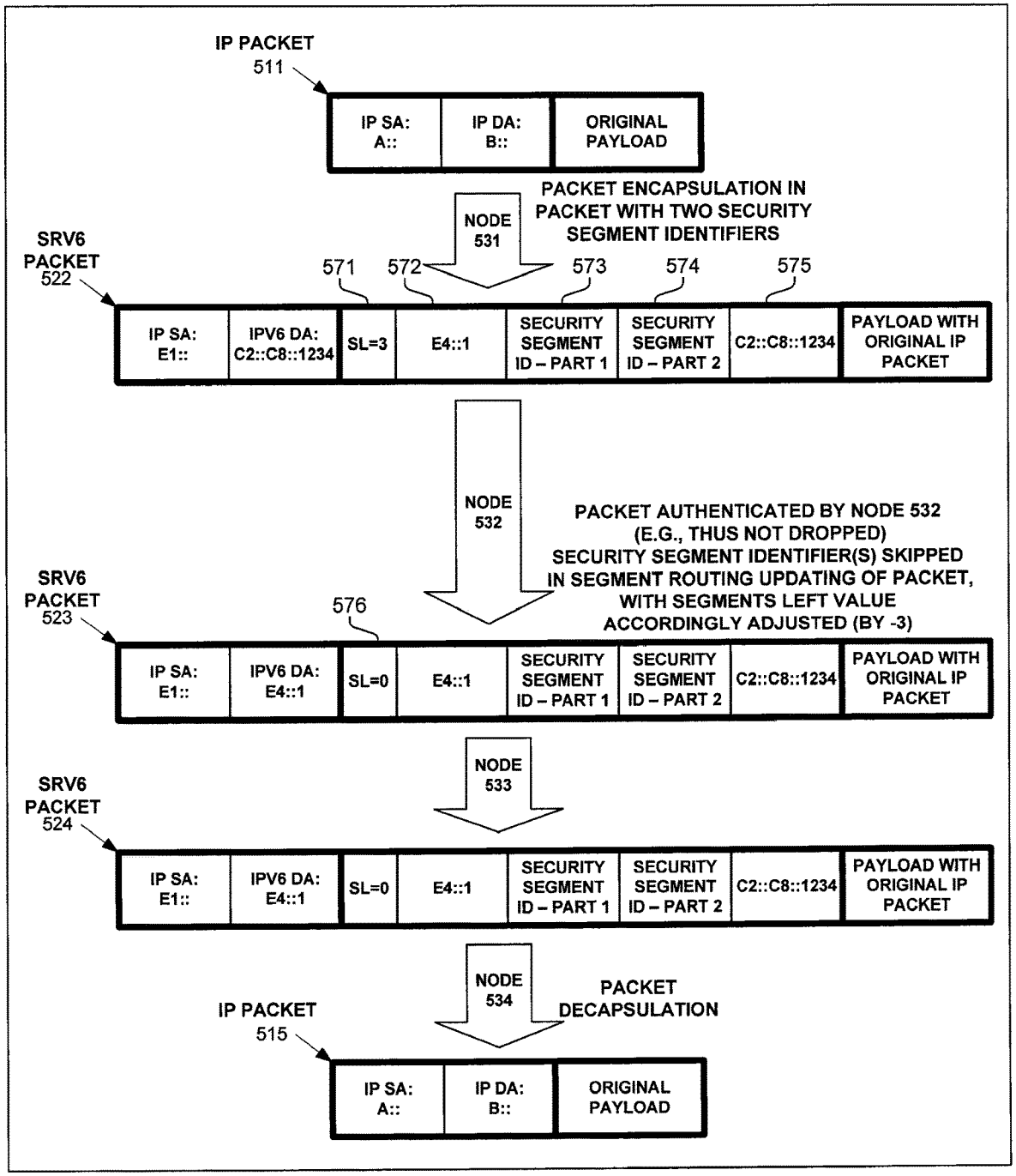
FIG. 5D illustrates packet processing of a packet according to one embodiment.

FIG. 5D illustrates an IP packet 511 being encapsulated and forwarded through network 500 according to a secure Segment Routing policy of one embodiment, with a Security Association having been established between Segment Routing nodes 531 and 532 for being authenticated by a secured Segment Routing function identified by C2::C8, with anti-replay protection enabled, and using a two Security Segment Identifiers (e.g., an integrity check value of up to 256 bits).

This network processing is very similar to that described in relation to FIG. 5B that uses an integrity check value contained in only one, not two, Security Segment Identifiers (or otherwise described herein), so the full description will not be repeated.

Network node 531 receives packet 511 and generates secure Segment Routing packet 522 which includes original packet 511 encapsulated therein. Segment Routing packet 522 has a Source Address of node 531, a Destination Address (same value as Segment Identifier 575) of a secured Segment Routing function of node 531. Segment Routing Header includes the four Segment Identifiers 572-575, Segments Left 571 having a value of three as Segment Identifier 575 is the current Segment Identifier (and the same as the Destination Address of packet 522). Note, the argument portion of Segment Identifier 575 (and low-order bits of the Destination Address) includes an anti-replay sequence number value of 1234. Node 531 formulates security Segment Identifiers 573-574 according to the established Security Association. Node 531 sends packet 522, including Security Segment Identifiers 573-574, into network 500.

Network node 532 receives packet 522, which has a Destination Address that is an address of node 532. Security authentication processing is performed according to the secured Segment Routing function identified by C2::C8 and according to the corresponding security association. In response to authentication, packet 522 is further processed (e.g., not dropped) such as, but not limited to, according to another Segment Routing function invoked by the secured Segment Routing function identified by C2::C8. Segments Left 571 of packet 522 is updated (to zero), as reflected as Segments Left 576 of packet 523, by being reduced by three to advance past current Segment Identifier 575 and the two Security Segment Identifiers 573 and 574 of packet 522, with the Destination Address of packet 523 being set to the Segment Identifier in the Segment List identified by the value of Segments Left 576 (i.e., value of zero). Packet 523 is sent from node 532.

Node 533 of network 500 receives packet 523, which is not addressed to node 533, thus is forwarded back into network 500 as denoted packet 524.

In response to receiving packet 524, node 534 operates according to the Segment Routing function identified by E4::1 to decapsulate and send IP packet 515 to client network 506. In one embodiment, even though received packet 524 includes the Security Segment Identifier, node 534 does not perform authentication processing based thereon; rather, node 534 simply ignores the Security Segment Identifier.

Figure 5E:
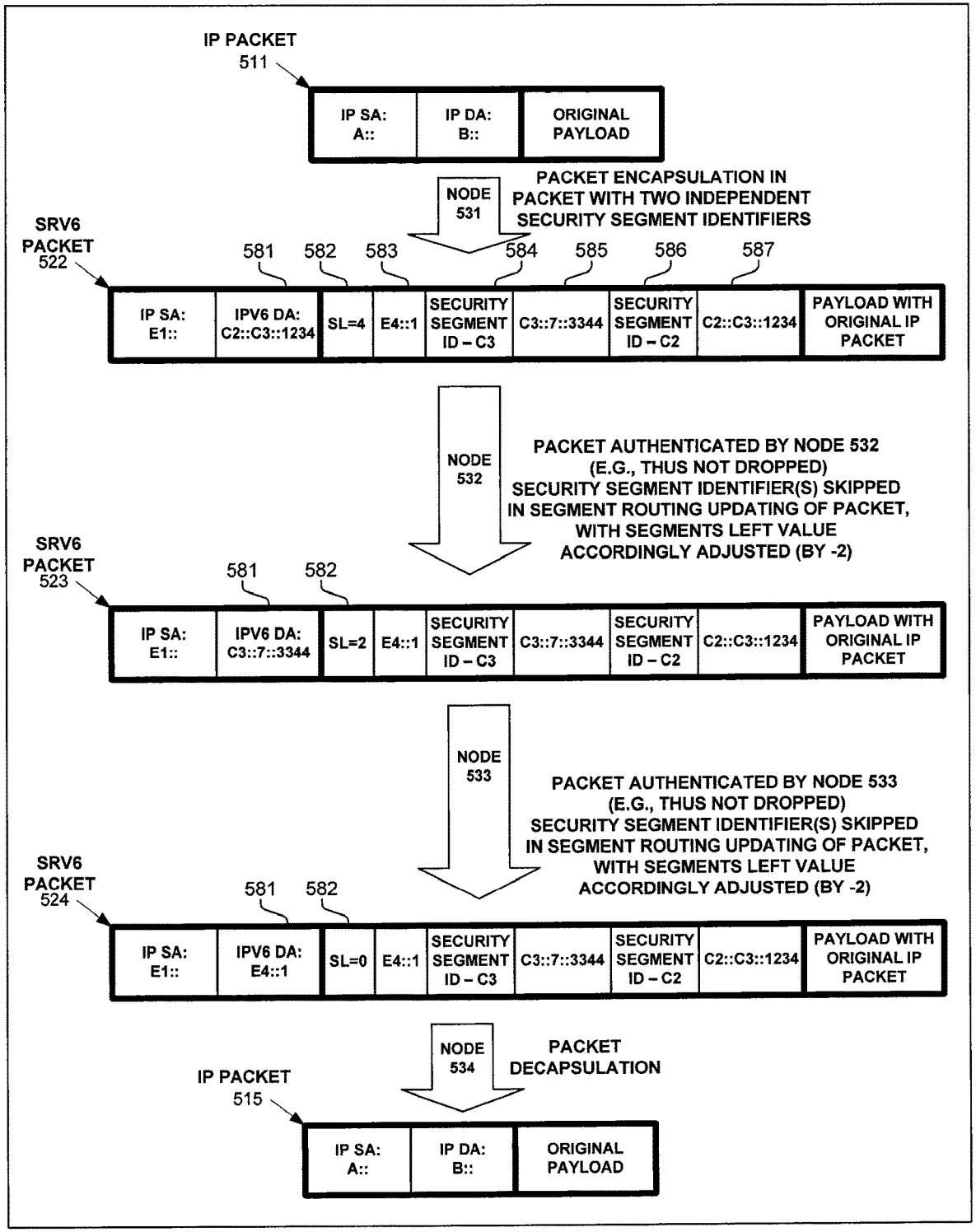
FIG. 5E illustrates packet processing of a packet according to one embodiment.

FIG. 5E illustrates an IP packet 511 being encapsulated and forwarded through network 500 according to a secure Segment Routing policy of one embodiment, with
- a first Security Association having been established between Segment Routing nodes 531 and 532 for being authenticated by a secured Segment Routing function identified by C2::C3, with anti-replay protection enabled; and
- a second Security Association having been established between Segment Routing nodes 531 and 533 for being authenticated by a secured Segment Routing function identified by C3::C7, with anti-replay protection enabled; and This network processing is very similar to that described in relation to FIG. 5B that uses a secured Segment routing function on one, not two nodes (or otherwise described herein), so the full description will not be repeated.

Network node 531 receives packet 511 and generates secure Segment Routing packet 522 which includes original packet 511 encapsulated therein. Segment Routing packet 522 has a Source Address of node 531, a Destination Address 581 (same value as Segment Identifier 587) of a secured Segment Routing function of node 531. Segment Routing Header includes the five Segment Identifiers 583-587, Segments Left 582 having a value of four as Segment Identifier 587 is the current Segment Identifier (and the same as the Destination Address of packet 522). Note, the argument portion of Segment Identifier 587 (and low-order bits of the Destination Address 581) includes an anti-replay sequence number value of 1234; while the argument portion of Segment Identifier 585 include an anti-replay sequence number value of 3344.

Node 531 formulates security Segment Identifiers 586 and 584 according to the their respective established Security Association. In one embodiment, a secured portion for the calculation of either security Segment Identifiers 584 or 586 includes the value of the other security Segment Identifiers 587 or 584.

In one embodiment, the secured portion of packet 523 includes its Destination Address 581, which is a different value than Destination Address 581 of packet 522 sent from node 531. Therefore, node 531, in formulating the value of Security Segment Identifier 584, uses the Destination Address 581 of packet 523 that will be received by node 533. Similarly, in one embodiment, the secured portion of packet 523 includes Segments Left 583. Therefore, node 531, in formulating the value of Security Segment Identifier 584, uses the value (two) of Segments Left 583 of packet 523.

Node 531 sends packet 522, including Security Segment Identifiers 586 and 584, into network 500.

Network node 532 receives packet 522, which has a Destination Address that is an address of node 532. Security authentication processing is performed according to the secured Segment Routing function identified by C2::C3 and according to the corresponding security association. In response to authentication, packet 522 is further processed (e.g., not dropped) such as, but not limited to, according to another Segment Routing function invoked by the secured Segment Routing function identified by C2::C3.

Segments Left 582 of packet 523 is updated (to two) by being reduced by two to advance past current Segment Identifier 587 and first Security Segment Identifier 586, with Destination Address 581 of packet 523 being set to the Segment Identifier in the Segment List identified by the value of Segments Left 582 (i.e., value of two). Packet 523 is sent from node 532.

Network node 533 receives packet 523, which has a Destination Address that is an address of node 533. Security authentication processing is performed according to the secured Segment Routing function identified by C3::C7 and according to the corresponding security association. In response to authentication, packet 523 is further processed (e.g., not dropped) such as, but not limited to, according to another Segment Routing function invoked by the secured Segment Routing function identified by C3::C7.

Segments Left 582 of packet 524 is updated (to zero) by being reduced by two to advance past current Segment Identifier 585 and second Security Segment Identifier 584, with Destination Address 581 of packet 524 being set to the Segment Identifier in the Segment List identified by the value of Segments Left 582 (i.e., value of zero). Packet 524 is sent from node 533.

In response to receiving packet 524, node 534 operates according to the Segment Routing function identified by E4::1 to decapsulate and send IP packet 515 to client network 506. In one embodiment, even though received packet 524 includes the two Security Segment Identifiers, node 534 does not perform authentication processing based thereon; rather, node 534 simply ignores the Security Segment Identifiers.

Figure 5F:
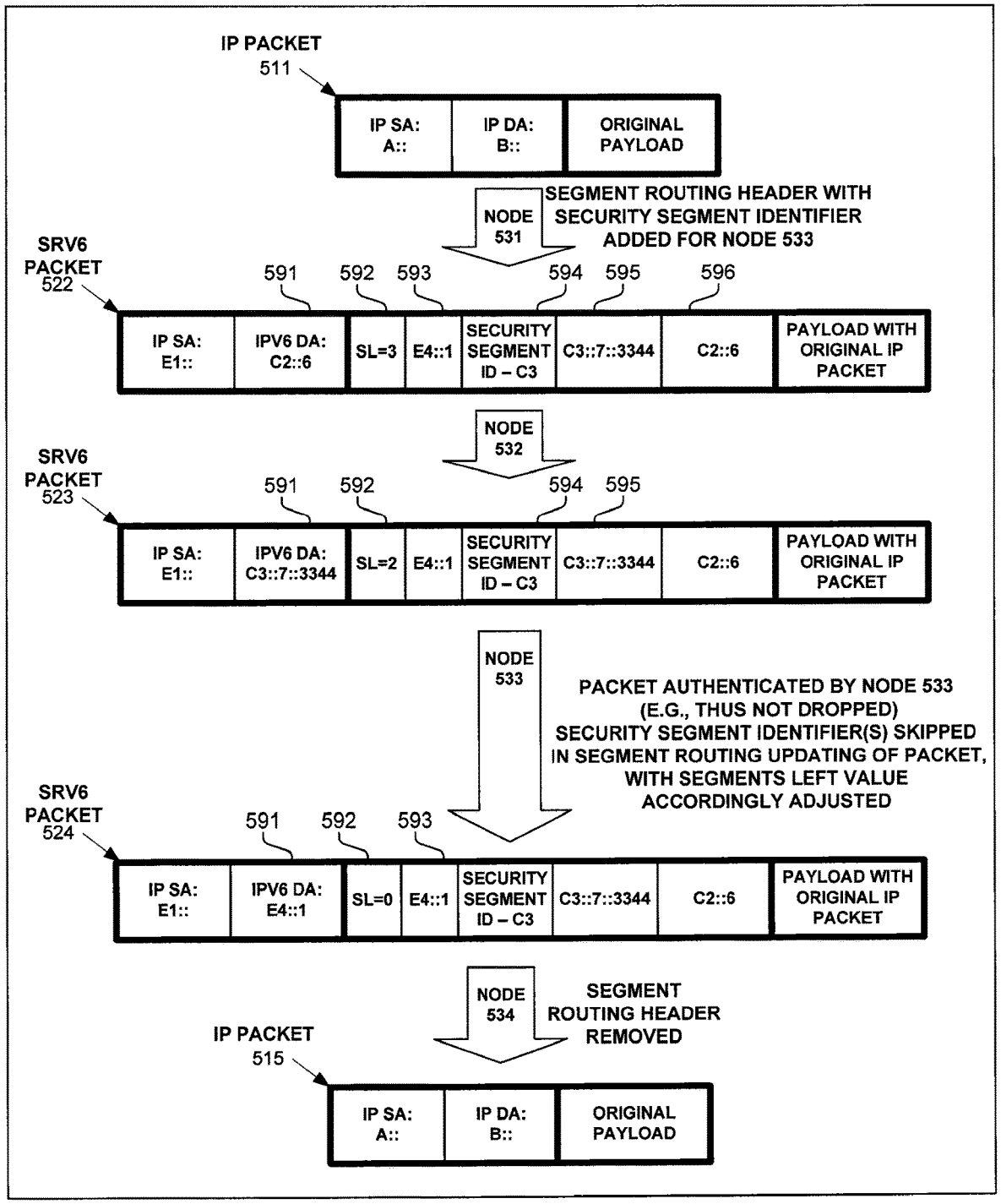
FIG. 5F illustrates packet processing of a packet according to one embodiment.

FIG. 5F illustrates an IP packet 511 being encapsulated and forwarded through network 500 according to a secure Segment Routing policy of one embodiment, with a Security Association having been established between Segment Routing nodes 531 and 533 (i.e., not directly connected Segment Routing node 532) for being authenticated by a secured Segment Routing function identified by C3:7, with anti-replay protection enabled, and using a single Security Segment Identifier.

This network processing is very similar to that described in relation to FIGS. 5B and 5E (or otherwise described herein), so the full description will not be repeated.

Network node 531 receives packet 511 and generates secure Segment Routing packet 522 which includes original packet 511 encapsulated therein. Segment Routing packet 522 has a Source Address of node 531, a Destination Address 591 (same value as Segment Identifier 596) of a non-secured Segment Routing function of node 531. The Segment List of packet 522 includes four Segment Identifiers 593-596, including Security Segment Identifier 594. Segments Left 592 is set to three. The argument portion of Segment Identifier 595 includes an anti-replay sequence number value of 3344.

Node 531 formulates security Segment Identifier 594 according to the established Security Association. In one embodiment, the secured portion of packet 523 includes its Destination Address 591 and Segments Left 592, which are different values in packet 522 sent from node 531 and packet 523 received by node 533. Therefore, node 531, in formulating the value of Security Segment Identifier 594, uses the Destination Address 591 and Segments Left 592 of packet 523, not of packet 522.

Node 531 sends packet 522, including Security Segment Identifier 594, into network 500.

Network node 532 receives packet 522, which has a Destination Address that is an address of node 532, which performs Segment Routing processing (including reducing Segments Left 592 by one and updating Destination Address 591). Resulting packet 523 is sent into network 500.

Network node 533 receives packet 523, which has a Destination Address that is an address of node 533. Security authentication processing is performed according to the secured Segment Routing function identified by C3::C7 and according to the corresponding security association. In response to authentication, packet 523 is further processed (e.g., not dropped) such as, but not limited to, according to another Segment Routing function invoked by the secured Segment Routing function identified by C3::C7.

Segments Left 592 of packet 524 is updated (to zero) by being reduced by two to advance past current Segment Identifier 595 and second Security Segment Identifier 594, with Destination Address 591 of packet 524 being set to the Segment Identifier in the Segment List identified by the value of Segments Left 592 (i.e., value of zero). Packet 524 is sent from node 533.

In response to receiving packet 524, node 534 operates according to the Segment Routing function identified by E4::1 to decapsulate and send IP packet 515 to client network 506. In one embodiment, even though received packet 524 includes the Security Segment Identifier 595, node 534 does not perform authentication processing based thereon; rather, node 534 simply ignores Security Segment Identifier 595.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   receiving, by a second Segment Routing node, a particular Segment Routing packet from a network, with the particular Segment Routing Packet including an outer Internet Protocol version 6 (IPv6) header comprising a Destination Address of the second Segment Routing node, with the particular Segment Routing packet including a particular Segment Routing Header comprising a particular Segment List including a plurality of Segment Identifiers (SIDs), with the plurality of SIDs including a Security Segment Identifier and a next Segment Router SID, and with the particular Segment Routing Header including a Segments Left indicating a current Segment Identifier;
   responsive to authenticating correctness of the particular Segment Routing packet based on the Security Segment Identifier and an integrity check value generated by security processing of a secured portion of the particular Segment Routing packet, the second Segment Routing node further processing, but not dropping, the particular Segment Routing packet, with said further processing including sending the particular Segment Routing packet into the network;
   wherein prior to said sending the particular Segment Routing packet into the network, the second Segment Routing node decrements the Segments Left, bypassing the Security Segment Identifier, to indicate the next Segment Router SID, and updates the Destination Address to the next Segment Router SID.

2. The method of claim 1, wherein the Segments Left indicates a specific Segment Identifier in the particular Segment List of the particular Segment Routing packet when said received by the second Segment Routing node, with the specific Segment Identifier with a value of being the Destination Address.

3. The method of claim 1, wherein an argument portion of the Destination Address includes an identifiable sequence number; and
wherein said authenticating correctness includes verifying the identifiable sequence number is a correct value for the particular Segment Routing packet said received by the second Segment Routing node.

4. The method of claim 1, wherein the plurality of SIDS includes one or more specific Segment Identifiers in addition to the Security Segment Identifier and the next Segment Router SID, and wherein the secured portion includes all of the plurality of SIDs.

5. The method of claim 4, wherein the secured portion includes the Segments Left and a Source Address in the outer IPv6 header of the particular Segment Routing packet when said received by the second Segment Routing node.

6. The method of claim 5, wherein said one or more specific Segment Identifiers includes at least two different Segment Identifiers with one or more of said at least two different Segment Identifiers not having a value of the Destination Address of the particular Segment Routing packet when said received by the second Segment Routing node.

7. The method of claim 3, wherein the low-order thirty-two bits of an extended sixty-four bit sequence number are the low-order thirty-two bits of the Destination Address; and wherein the argument portion comprises the low-order thirty-two bits of the Destination Address.

8. The method of claim 1, wherein said authenticating correctness includes processing the secured portion using a one-way cryptographic hash function on at least the secured portion.

9. The method of claim 1, wherein said authenticating correctness includes processing the secured portion using a one-way cryptographic hash function on at least the secured portion and a common key.

10. The method of claim 1, wherein the Destination Address is different when the particular Segment Routing packet is sent by a first Segment Routing node and when subsequently received by the second Segment Routing node; and wherein the Security Segment Identifier is included in the particular Segment Routing packet by the first Segment Routing node.

11. A method, comprising:
receiving a particular packet by a first Segment Routing node in a network;
encapsulating, by the first Segment routing node, said received particular packet resulting in a protected Segment Routing packet, with the protected Segment Routing packet being an Internet Protocol version 6 (IPv6) packet comprising a Destination Address field in an outer IPv6 header and comprising a Segment Routing Header including a Segment List and a Segments Left; with the Segment List including a specific network address of a second Segment Routing node and with one or more second Security Segment Identifiers to authenticate the protected Segment Routing packet by the second Segment Routing node, with said one or more second Security Segment Identifiers being determined based on a cryptographic hash function of an anticipated state of a protected portion of the protected Segment Routing packet when received by the second Segment Routing node, with the protected portion comprising a plurality of protected values including a value of the Destination Address field; and
sending the protected Segment Routing packet from the first Segment Routing node into the network.

12. The method of claim 11, comprising:
receiving, by the second Segment Routing node via the network, the protected Segment Routing packet with the value of the Destination Address field being the specific network address, and with the Segment List including said one or more second Security Segment Identifiers;
generating one or more integrity Security Segment Identifiers based the cryptographic hash function applied to the protected portion of the protected Segment Routing packet using current values of the plurality of protected values at time of receipt of the protected Segment Routing packet node; and
responsive to authenticating correctness of the protected Segment Routing packet based on said generated one or more integrity Security Segment Identifiers and said one or more second Security Segment Identifiers received in the protected Segment Routing packet, the second Segment Routing node further processing, but not dropping, the protected Segment Routing packet.

13. The method of claim 12, wherein an argument portion of the specific network address includes a sequence identification value; and
wherein said authenticating correctness includes verifying the sequence identification value is a correct value for the protected Segment Routing packet when received by the second Segment Routing node.

14. The method of claim 12, wherein the first Segment Routing node and the second Segment Routing node each use a shared key in performing said cryptographic hash function.

15. The method of claim 12, wherein values of the Destination Address field are different when the protected Segment Routing packet is said sent from the first Segment Routing node and when said received by the second Segment Routing node.

16. The method of claim 15, wherein the network includes the first Segment Routing node, the second Segment Routing node, and a third Segment Routing node; and wherein when the protected Segment Routing packet is said sent from the first Segment Routing node: the Destination Address field is a specific IPv6 address of the third Segment Routing node, and the Segment List includes in relative order from first to last Segment Routing traversal order: a third Segment Identifier with a value of the specific IPv6 address, one or more specific third Security Identifiers to use in authenticating the protected Segment Routing packet by the third Segment Routing node, a second Segment Identifier of an IPv6 address of the second Segment Routing node, and said one or more second Security Segment Identifiers.

17. The method of claim 16, comprising:
receiving, by the third Segment Routing node via the network, the protected Segment Routing packet with the Destination Address field having a value of the specific IPv6 address;
generating one or more third integrity Security Segment Identifiers using the cryptographic hash function applied to the protected portion of the protected Segment Routing packet using current values of the plurality of protected values at time of receipt of the protected Segment Routing packet by the third Segment Routing node; and in response to authenticating correctness of a secured portion of the protected Segment Routing packet based on said one or more third integrity Security Segment Identifiers and said one or more specific third Security Identifiers from said received protected Segment Routing packet, the third Segment Routing node further processing, comprising specific updating and then sending into the network, of the protected Segment Routing packet, with said specific updating including updating the Segments Left to indicate the second Segment Identifier and setting the Destination Address field to the second Segment Identifier.

18. The method of claim 11, wherein the network includes the first Segment Routing node, the second Segment Routing node, and a third Segment Routing node; and wherein, when the protected Segment Routing packet is said sent from the first Segment Routing node, the Segment List includes at least three Segment Identifiers comprising a first Segment Identifier with a value of the Destination Address field, said one or more second Security Segment Identifiers, and a third Segment Identifier with a value of an address of the third Segment Routing node; and wherein the plurality of protected values includes the first Segment Identifier and the third Segment Identifier.

19. A Segment Routing node, comprising:
one or more hardware interfaces sending and receiving packets with a network; and
one or more network processors with memory associated therewith;
wherein the Segment Routing node performs packet processing operations, with said packet processing operations including:
receiving a particular Segment Routing packet from the network, with the particular Segment Routing Packet including an outer Internet Protocol version 6 (IPv6) header comprising a Destination Address of the Segment Routing node, with the particular Segment Routing packet including a particular Segment Routing Header comprising a particular Segment List including a plurality of Segment Identifiers (SIDs), with the plurality of SIDs including a Security Segment Identifier and a next Segment Router SID, and with the particular Segment Routing Header including a Segments Left indicating a current Segment Identifier;
responsive to authenticating correctness of the particular Segment Routing packet based on the Security Segment Identifier and an integrity check value generated by security processing of a secured portion of the particular Segment Routing packet, further processing, but not dropping, the particular Segment Routing packet, with said further processing including sending the particular Segment Routing packet into the network;
wherein prior to said sending the particular Segment Routing packet into the network, decreasing the Segments Left, bypassing the Security Segment Identifier, to indicate the next Segment Router SID, and updates the Destination Address to the next Segment Router SID.

20. The Segment Routing node of claim 19, wherein an argument portion of the Destination Address includes an identifiable sequence number; and
wherein said authenticating correctness verifying the identifiable sequence number is a correct value for the particular Segment Routing packet said received by the Segment Routing node.

* * * * *